United States Patent

Trageser

[11] 3,731,537
[45] May 8, 1973

[54] GRAVITY GRADIOMETER

[75] Inventor: Milton B. Trageser, Winchester, Mass.

[73] Assignee: Massachusetts Institute of Technology, Cambridge, Mass.

[22] Filed: June 22, 1970

[21] Appl. No.: 48,417

[52] U.S. Cl. .................................73/382, 235/151.3
[51] Int. Cl. ................................................G01v 7/16
[58] Field of Search ..........................73/382, 178 R; 235/151.3

[56] References Cited

UNITED STATES PATENTS 3,180,151  4/1965  Gustafson..............................73/382
3,229,520  1/1966  Savet......................................73/178

*Primary Examiner*—James J. Gill
*Attorney*—Thomas Cooch, Arthur A. Smith, Jr. and Martin M. Santa

[57] ABSTRACT

An improved gravity gradiometer and system for use thereof for accurately measuring gravity gradients from moving vehicles. The gradiometer comprises a symmetrically configured float buoyantly supported in a high-density, low-viscosity fluid within a symmetrically configured case of slightly larger size. The instrument is configured and maintained such that the float is neutrally buoyant. Further, the mass of the float is distributed in accordance with the particular gravity gradient sought to be measured. The float is suspended in 6° of freedom via a highly sensitive electric or magnetic suspension system which, in combination with a feedback control loop, acts to measure the desired component or combination of components of the gravity gradient in a manner described. The gradiometer incorporates a highly precise thermal control sub-system and an extremely sensitive internal balancing arrangement. One or more gradiometers is employed in an inertially stabilized system so as to measure the desired components or combinations of components of the gravity gradient from a moving vehicle.

9 Claims, 15 Drawing Figures

INVENTOR:
MILTON B. TRAGESER
BY Arthur A. Smith, Jr.
ATTORNEY

INVENTOR:
MILTON B. TRAGESER
BY Arthur A. Smith, Jr.
ATTORNEY

INVENTOR:
MILTON B. TRAGESER
BY Arthur A. Smith, Jr.
ATTORNEY

GRAVITY GRADIOMETER

The invention described herein was made in the course of work performed under a contract with the Air Force Systems Command, Department of the Air Force.

BACKGROUND OF THE INVENTION

1. Field of the Invention

This invention relates generally to gravity measuring instruments and particularly to an improved gravity gradiometer for use in geophysical exploration and other applications.

2. Description of the Prior Art

It is known among geophysicists that various sub-surface structures often indicate mineral deposits, such as oil, gas, and the like; and, further, that minute variations in the gravitational field occur on the surface of the earth in the area of these sub-surface structures. Accordingly, various instruments have been devised to measure the earth's gravity field and/or components thereof and gradient changes therein, with the object of determining the location and extent of such deposits.

A device used in the past for geophysical surveying is the Eötvös Torsion Balance. In general, this device comprises two masses of equal weight located at different heights and connected by a horizontal beam which is suspended by a torsion wire so that it is free to rotate in a horizontal plane about the wire. The beams rotate only when a differential horizontal force acts on the weights, and this occurs when the gravitational field is distorted so that the horizontal component at one mass is different from that at the other. The differences in the earth's gravitational attraction for these two weights or masses causes differences in deflection of the torsion wire that can be measured. A number of measurements are taken with the beam at different azimuthal orientations, and the results are employed in equations which, when solved, provide a plurality of quantities which define the horizontal gradients of gravity and the differential curvature. Although the Eötvös Torsion Balance is particularly useful to detect gravity gradients, it is subject to a number of serious limitations and disadvantages. Specifically, the Eötvös Torsion Balance requires a relatively long set-up time. The instrument cannot be used in a moving vehicle. Further, the stationary Eötvös Balance is extremely sensitive to local masses, such as rocks, moving animals, and the like; and it is easily disturbed by vibration of any type. Consequently, in order to use this device effectively, a site considered to be typical must be chosen and leveled and a topographical map of the area must be made. The process is tedious and time-consuming.

Another popular device for geophysical surveying and similar scientific measuring is the gravimeter which is an extremely sensitive weighing device. In these type devices a known mass is generally supported by springs, and the gravitational attraction on the mass varies with the earth's gravitational field. Either the elongation of the spring or the force required to return the mass to a null position is measured. Although the gravimeters developed to date generally have a quicker set-up time than the Eötvös Balance and are not quite as vibration sensitive, they also suffer from severe disadvantages. Specifically, to interpret the data achieved with a gravimeter, it is necessary to know the relative elevations of each and every observation point within the surveyed area with extreme accuracies; hence, an extremely accurate leveling survey must be conducted for use with the gravimeter. Further, the gravimeters are also sensitive to acceleration. This prohibits their accurate use in moving vehicles.

To summarize, although a number of gravity measuring instruments are presently available in the art, such devices have severe limitations when used for geophysical surveying. All of these devices require a large number of individual measurements of the gravity gradient or gravity magnitude at different locations or stations on the earth's surface. The making of stationary field measurements is in and of itself a time-consuming process since the measuring instruments must be carried from point to point over the entire area to be surveyed. The time element is further increased, as aforementioned, by the preparation time involved prior to using these instruments. Further, such devices have been found to be, in general, unsuitable for accurate use in trucks or aircraft. For example, when attempts have been made to employ gravimeters in aircraft, it has been necessary to measure the elevation of the aircraft with extreme accuracy and then subtract out the acceleration and other forces acting on the aircraft so as to calculate the gravity factor itself. Uncertainty in altitude results in a lack of resolution which, in turn, seriously impedes the accuracy of the device. Likewise, the extreme sensitivity of the Eotvos Torsion Balance to vibration and acceleration precludes its satisfactory use in moving vehicles.

All of the aforementioned disadvantages of presently available gravity measuring devices apply equally well to inertial navigation applications as well as to geophysical surveying.

SUMMARY

In view of the foregoing limitations in the use of presently existing gravity measuring instruments, it is a general object of the invention to provide an improved gravity gradiometer and system for employing same capable of performing relatively rapid and extremely accurate geophysical surveys while the instrument is carried in a moving vehicle.

It is another object of the invention to provide an improved gravity gradiometer and system capable of precisely measuring the free air gravity anomaly from a moving vehicle using only moderately accurate altitude and velocity data.

It is yet another object of the invention to provide an improved gravity gradiometer and system capable of precisely measuring deflection of the vertical from a moving vehicle using only moderately accurate altitude and velocity data.

These and other objects are met by an improved gravity gradiometer essentially comprising a symmetrically configured float buoyantly supported in a high-density, low-viscosity fluid within a symmetrically configured case of slightly larger size. The mass configuration of the float is such that it is supported in the suspension fluid in a condition of essentially neutral buoyancy such that negligible force is necessary to maintain the float centered within the case for all values of gravity and linear acceleration. This condition of neutral buoyancy is even more precisely obtained and maintained by a highly precise thermal control system. Further, a sensitive internal balancing arrangement is used in combination with the thermal system to establish and maintain the float configuration such that negligible torque moments will act to cause angular acceleration of the float as a result of the application of all values of gravity and linear acceleration. In other words, the instrument is designed to eliminate the necessity for strong electric or magnetic fields in the measurement process and to scale the measurement problem to workable accuracies in the order of several parts in ten thousand. The mass distribution of the float is determined so as to establish the torque moment which acts to cause angular acceleration of the float as a result of the application of the gravity gradient sought to be measured. That is, the mass distribution is determined so that the desired component or combination of components of the gravity gradient to be measured produces a component of torque moment about a specified axis of float symmetry.

The measurement of the desired component or combination of components of the gravity gradient is effected via a sensitive and highly accurate electric or magnetic suspension system which electrically or magnetically applies about the axis of symmetry a known torque moment to counteract the torque experienced from the gravity gradient. Failure of the known torque moment to perfectly counteract the gravity gradient torque moment produces angular acceleration of the float about the degree of freedom provided by the symmetry. This angular acceleration results in angular displacement of the float relative to the case about the axis of symmetry. The angular displacement, in turn, is electrically or magnetically sensed via the suspension system and is used in a feedback loop to control the known applied torque moment. The feedback loop acts to maintain the angular displacement of the float at a negligibly low level, thus establishing the equivalence of the average of the known torques and the average of the gradient torques.

The preferred embodiment of the invention is an axially symmetric instrument wherein the float and case are both configured as cylinders and wherein a capacitive suspension system is employed. However, a number of alternate configurations and embodiments are presented within the scope of the invention. Further, according to the invention, one or more gradiometers is employed on an inertially stabilized platform in conjunction with necessary inertial measuring components to form a system for measuring the free air gravity anomaly and/or vertical deflections. The number of gradiometers employed in a system depends on the particular application and on the specific mass configuration used in the gradiometer float.

The invention and the operation thereof will be apparent from the specification which follows in conjunction with the drawings.

DRAWINGS

PREFERRED EMBODIMENT

Mathematical Development

Figure 1:
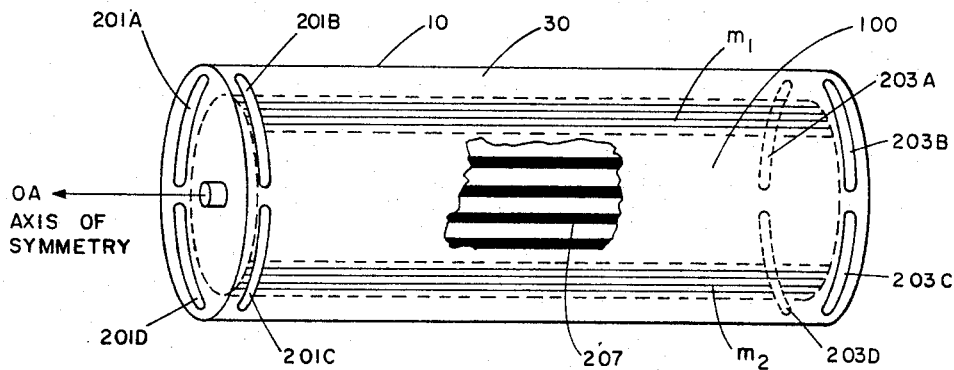
FIG. 1 is a cutaway view of the gradiometer instrument.

According to the invention, a special float mass configuration is required such as to meet the following conditions: the configuration must be such as to result in negligible force being needed to maintain the float centered within the case for all values of gravity and linear acceleration; the configuration must be such as to result in negligible torque moments acting to cause angular acceleration of the float responsive to the application of all values of gravity and linear acceleration. These conditions are mathematically defined in the following discussion.

Let 0 be the origin of a coordinate system located on the axis or axes of symmetry. The coordinate system rotates with the earth. The acceleration of 0 is $\vec{a}_o$. The value of gravity at 0 is $\vec{g}_o$. Let the apparent acceleration at 0 be defined as $$A_o = \vec{a}_o - \vec{g}_o \quad (1)$$

The components of the apparent acceleration within the gradiometer can be well approximated by the following equations:

$$A_x = a_{ox} - g_{ox} - x(\delta g_x/\delta x) - y(\delta g_x/\delta y) - z(\delta g_x/\delta z)$$
$$A_y = a_{oy} - g_{oy} - x(\delta g_y/\delta x) - y(\delta g_y/\delta y) - z(\delta g_y/\delta z)$$
$$A_z = a_{oz} - g_{ox} - x(\delta g_z/\delta x) - y(\delta g_z/\delta y) - z(\delta g_z/\delta z) \quad (2)$$

The above equations define the components of the gravity gradient.

Let $\Delta m_w$ be an element of float mass. Let $\Delta m_B$ be an element of buoyancy fluid displaced mass. Let $\vec{F}_w$ be the weight of the float in reaction to the apparent acceleration. Let $\vec{F}_B$ be the buoyant force on the float from the hydrostatic pressure gradient resulting from the reaction of the density of a homogenous fluid to the apparent acceleration. Two equations follow from these definitions.

$$\vec{F}_w = -\Sigma \vec{A} \Delta m_w$$

$$\vec{F}_B = \Sigma \vec{A} \Delta m_B \tag{3}$$

Each component in $\vec{F}_w$ must be equal and opposite its counterpart in $\vec{F}_B$ for negligible centering forces to be required.

$$\Sigma \vec{A} (\Delta m_w - \Delta m_B) = 0 \tag{4}$$

The following conditions are necessary to satisfy Equation (4) given arbitrary values for acceleration, gravity and the gravity gradient components:

$$\Sigma \Delta m_w = \Sigma \Delta m_B \tag{5}$$

$$\Sigma x (\Delta m_w - \Delta m_B) = 0$$

$$\Sigma y (\Delta m_w - \Delta m_B) = 0$$

$$\Sigma z (\Delta m_w - \Delta m_B) = 0 \tag{6}$$

The condition in Equation (5) is of practical significance for obtaining centering force equilibrium. Plausible values for the unbalances in Equation (6) make these conditions of little consequence with respect to centering force equilibrium.

Consider the element of float mass or displaced buoyancy fluid mass located at point P within the float. The torque moments applied to the float about O by the reaction of these mass elements to the apparent acceleration are $$\Delta \vec{M}_w = \vec{R}_{op} \times \Delta \vec{F}_w = -\vec{R}_{op} \times \vec{A} \Delta m_w$$

$$\Delta \vec{M}_B = \vec{R}_{op} \times \Delta \vec{F}_B = \vec{R}_{op} \times \vec{A} \Delta m_B \tag{7}$$

Summing all the elements of mass and displaced mass of the float and adding the above two relationships gives the total torque moment on the float. New term $\Delta m$ is introduced for simplicity $$\vec{M} = -\Sigma \vec{R}_{op} \times \vec{A} (\Delta m_w - \Delta m_B) = -\Sigma \vec{R}_{op} \times \vec{A} \Delta m \tag{8}$$

Substitution of Equation (2) and components of $R_{op}$ resolves Equation (8) into components $$M_x = -A_{oz}\Sigma y\Delta m + A_{oy}\Sigma z\Delta m$$

$$+ (\delta g_z/\delta z - \delta g_y/\delta y) \Sigma yz\Delta m$$

$$+ (\delta g_z/\delta y) \Sigma y^2\Delta m - (\delta g_y/\delta z) \Sigma z^2\Delta m$$

$$+ (\delta g_z/\delta x) \Sigma xy\Delta m - (\delta g_y/\delta x) \Sigma xz\Delta m$$

$$M_y = -A_{ox}\Sigma z\Delta m + A_{oz}\Sigma x\Delta m +$$

$$M_z = -A_{oy}\Sigma x\Delta m + A_{ox}\Sigma y\Delta m + \tag{9}$$

Inspection of Equation (9) reveals that the three conditions of Equation (6) must be accurately met if negligible torque moments are to result from the application of all values of gravity and linear acceleration.

The following relationships are well known from potential theory:

$$(\delta g_x/\delta y) = (\delta g_y/\delta x)$$

$$(\delta g_y/\delta z) = (\delta g_z/\delta y)$$

$$(\delta g_z/\delta x) = (\delta g_x/\delta z) \tag{10}$$

Substitution of Equation (10) and the assumption that the three conditions of Equation (6) are accurately enough met leads to the simplification of Equation (9).

$$M_x = (\delta g_z/\delta z - \delta g_y/\delta y) \Sigma yz\Delta m + (\delta g_z/\delta y) \Sigma(y^2 - z^2) \Delta m$$

$$+ (\delta g_z/\delta x) \Sigma xy\Delta m - (\delta g_y/\delta x) \Sigma xz\Delta m$$

$$M_y = (\delta g_x/\delta x - \delta g_z/\delta z) \Sigma zx\Delta m + (\delta g_x/\delta z) \Sigma(z^2 - x^2) \Delta m$$

$$+ (\delta g_x/\delta y) \Sigma yz\Delta m - (\delta g_z/\delta y) \Sigma yx\Delta m$$

$$M_z = (\delta g_y/\delta y - \delta g_x/\delta x) \Sigma xy\Delta m + (\delta g_y/\delta x) \Sigma(x^2 - y^2) \Delta m$$

$$+ (\delta g_y/\delta z) \Sigma zx\Delta \Sigma m - (\delta g_x/\delta z) zy\Delta m \tag{11}$$

The following are the definitions of the well known moments and products of inertia from classical mechanics:

$$\begin{aligned} I_{xx} &= \Sigma (y^2 + z^2) \Delta m & I_{xy} &= \Sigma x y \Delta m \\ I_{yy} &= \Sigma (z^2 + x^2) \Delta m & I_{yz} &= \Sigma y z \Delta m \\ I_{zz} &= \Sigma (x^2 + y^2) \Delta m & I_{zx} &= \Sigma z x \Delta m \end{aligned} \tag{12}$$

$I_{xx}$ becomes a principal moment of inertia when $I_{xy}$ and $I_{zx}$ becomes zero; $I_{yy}$ becomes a principal moment of inertia when $I_{xy}$ and $I_{yz}$ becomes zero; $I_{zz}$ becomes a principal moment of inertia when $I_{yz}$ and $I_{zx}$ become zero.

It can be seen that Equation (11) may be expressed in an alternate form as:

$$M_x = (\delta g_z/\delta z - \delta g_y/\delta y) I_{yz} + (\delta g_z/\delta y) (I_{zz} - I_{yy})$$

$$+ (\delta g_z/\delta x) I_{xy} - (\delta g_y/\delta x) I_{xz}$$

$$M_y = (\delta g_x/\delta x - \delta g_z/\delta z) I_{zx} + (\delta g_x/\delta z) (I_{xx} - I_{zz})$$

$$+ (\delta g_x/\delta y) I_{yz} - (\delta g_z/\delta y) I_{yx}$$

$$M_z = (\delta g_y/\delta y - \delta g_x/\delta x) I_{xy} + (\delta g_y/\delta x) (I_{yy} - I_{xx})$$

$$+ (\delta g_y/\delta z) I_{zx} - (\delta g_x/\delta z) I_{zy} \tag{13}$$

According to the invention the improved gradiometer is capable of accurately measuring one or more of the gravity gradients expressed in Equation Set (13). Measurement of the desired gravity gradient is effected by employing a gross mass distribution so as to maximize the appropriate inertia characteristic. For example, say it is desired to measure the gravity gradient ($\delta g_z/y$), which is defined as the rate at which the vertical component of gravity ($z$) changes with translations in $y$, where $x$, $y$, $z$ denote the axes of an orthogonal coordinate system. Hence, the $M_x$ equation of Set (13) is to be solved. In this example, where the moment $M$ is to be measured about the $x$ axis of symmetry of the instrument, the mass configuration of the instrument must be such as to maximize the difference in moments of inertia $I_{zz} - I_{yy}$. Further, the values of $I_{xy}, I_{yz}, I_{zx}$ will all equal zero.

For a discussion of gravity gradients and moments of inertia, Applicant refers to The Horizontal Gradients of Gravity in Geodesy, by Ivan Mueller, The Ohio State University Department of Geodetic Science, 1964; The Earth and Its Gravity Field, McGraw-Hill Company, Inc., 1958, by W.A. Heiskanen, F.A. Vening Meinesz; Classical Mechanics, Addison-Wesley Publishing Company, Inc., 1950, by Herbert Goldstein, incorporated herein by reference, to name but a few references in the field. Briefly, to aid in understanding more fully the background of the invention, the following definitions are presented prior to describing the preferred embodiment itself. In potential theory there are nine (9) gravity gradients.

$$(\delta g_x/\delta x) \quad (\delta g_y/\delta x) \quad (\delta g_z/\delta x)$$
$$(\delta g_x/\delta y) \quad (\delta g_y/\delta y) \quad (\delta g_z/\delta y) \quad (14)$$
$$(\delta g_x/\delta z) \quad (\delta g_y/\delta z) \quad (\delta g_z/\delta z)$$

The aforementioned gradients comprise both cross-gradients and "together" gradients. A cross-gradient of gravity is defined as one relating rate of change of a given component of gravity at some point in space to translation of that point in space in a direction transverse to the direction of that component of gravity. The gravity gradients $(\delta g_z/\delta y)$, $(\delta g_y/\delta x)$, and the like, are cross-gradients. A "Together" Gradient is defined as one relating rate of change of a given component of gravity at some point in space to translation of that point in space in the direction of the gravity component. The gravity gradients $(\delta g_z/\delta z)$, $(\delta g_x/\delta x)$, and the like, are "together" gradients.

Instrument Configuration

The preferred embodiment of the gravity gradiometer, as illustrated in FIG. 1, comprises a cylindrically configured outer case 10 within which is suspended a cylindrically configured float 100, the axis of cylinder of the float constituting the instrument's output axis (OA). (In a perfectly suspended instrument, the axis of cylinder of outer case 10 and that of float 100 are coincident.) Incorporated within the float's structure are mass concentrations or slugs $m_1$ and $m_2$ arranged along opposite ends of a diameter as shown more clearly in FIG. 2 to be discussed. Between float 100 and case 10 is a small clearance space 30 which is filled with a suspension fluid of extremely low-viscosity and high-density to provide necessary flotation and some viscous restraint.

As aforementioned, the mass configuration of the float is such that the float is supported in the suspension fluid in a condition of essentially neutral buoyancy, thereby resulting in negligible force being necessary to keep the float centered inside of the case for all values of gravity and linear acceleration. This centering force condition of neutral buoyancy, as defined in Equation (5), is adjusted and maintained by a thermal control system which is described in detail later in the specification. Further, as aforementioned, the mass configuration of float 100 is such as to result in negligible torque moments acting to cause angular acceleration of the float as a result of the application of all values of gravity and linear acceleration. These latter conditions, as expressed by the three equations of Set (6) are established and maintained by a sensitive internal balancing arrangement, to be described, in conjunction with the thermal system.

In addition, a capacitive suspension system is used to sense displacement of float 100 from its nominal or null position and to impose small trimming forces. The suspension system, which is described in detail later in the specification, is also used to apply torques and to measure angles about the instrument's output axis. Briefly, the suspension system suspends the float in six degrees of freedom. Radial suspension is effected via electrodes 201A, 201B, 201C and 201D suitably arranged along the inner surface of case 10 at one end of float 100 and electrodes 203A, 203B, 203C and 203D likewise arranged at the other end of float 100. As explained later in the specification, rotary suspension is effected via electrodes (not shown) on the inner surface of case 10 in conjunction with a circuit array 207 on the float's outer surface while axial suspension is likewise effected by electrodes (not shown) on the inner surface of case 10. Pivots 11A and 11B are provided at the two ends of float 100 along the axis of cylinder as stops for use only during storage of the instrument. These pivots are not used in suspending the float. A more detailed description of the instrument and of its operation is now described in the remainder of the specification.

Figure 2:
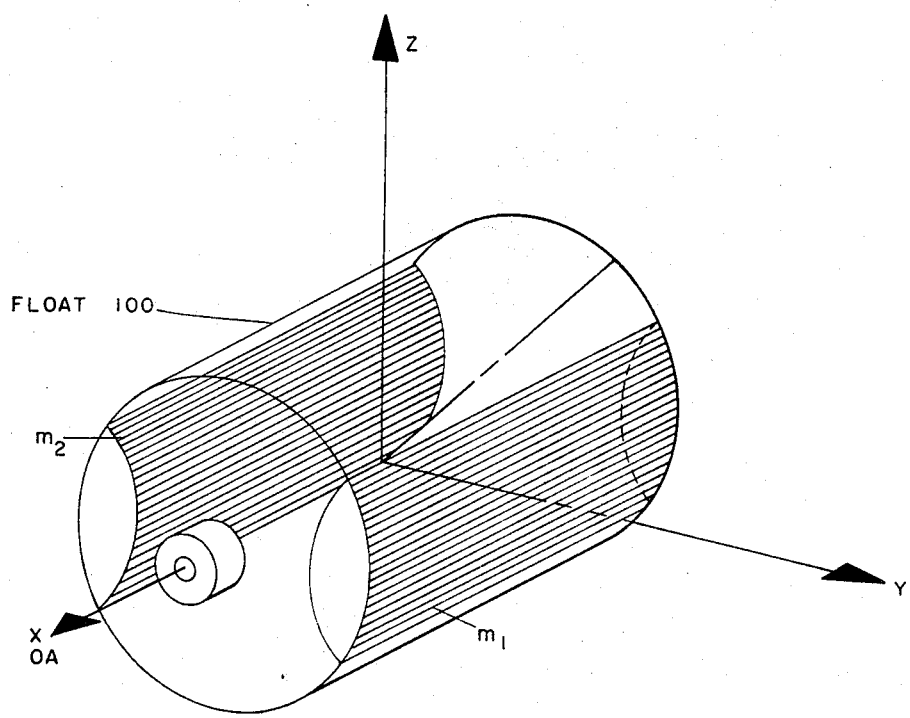
FIG. 2 is a cutaway view of the float component of the gradiometer having an axially symmetric mass configuration.

Reference is made to FIG. 2 taken in conjunction with FIG. 1. The preferred embodiment of the float shown in FIG. 2 has a mass configuration that is axially symmetric and, for purposes of accuracy, is assumed to be at rest on the earth or on a stabilized platform. As noted therein, masses $m_1$ and $m_2$ are incorporated within the inner surface of float 100 on opposite ends of a diameter. The configuration of the total of all of the float mass elements $\Delta m_w$, less the total of all of the displaced fluid mass elements, $\Delta m_B$, is designed and balanced to accurately meet the aforementioned conditions of neutral buoyancy, expressed by Equation (5), and precise balancing, expressed by Equation Set (6). Further, for the axially symmetric configuration, the gross mass distribution is designed so as to meet the following conditions for appropriate moments of inertia taken about 0 on the axis of symmetry of the float:

$$I_{zz} + I_{yy} = + \text{substantial value}$$

$$I_{xy} \doteq 0$$

$$I_{yz} = 0$$

$$I_{zx} = 0 \quad (15)$$

By designing the gross mass distribution so as to fulfill all of the aforementioned conditions, negligible forces and torques act to accelerate float 100 relative to case 10 as a result of the application of acceleration or gravity to the instrument. Applying the above conditions to Equation Set (13) a desired component of the gravity gradient produces a torque moment about the axis of symmetry, $x$, as follows:

$$M_x = (\delta g_z/\delta y)(I_{zz} - I_{yy}) \quad (16)$$

For the axially symmetric design of FIG. 2, where the axis of symmetry (output axis) is the $x$ axis of an orthogonal coordinate system.

In the preferred embodiment of FIG. 2, for the axially symmetric case, two mass concentrations $m_1$ and $m_2$ are depicted. According to the invention, however, any mass concentration is contemplated that will meet the aforementioned conditions expressed by Equations (5), (6) and (15).

The result expressed by Equation (16) is verified with further reference to FIG. 2. Assume mass concentrations $m_1$ and $m_2$ are replaced by their approximate equivalents, equal point masses m located near the centers of mass of $m_1$ and $m_2$. Their locations, for example, might thus be on the y axis at $+r$ and $-r$. The conditions of Equations (5) and (6) would still be met provided 0 was at the centroid of buoyancy as well as on the axis of symmetry. The conditions of Equation (15) would also be met with $(I_{zz} - I_{yy}) = 2\ mr^2$. The "downward" (minus z) component of gravity at $m_1$ would be the same as that at 0 reduced by $r\ (\delta g_z/\delta y)$. The "downward" force on mass $m_1$ would be $m\ (g_o - r\ \delta g_z/\delta y)$. The moment about the plus x axis would be $-rm\ (g_o - r\ \delta g_z/\delta y)$. Similarly, the "downward" component of gravity at $m_2$ would be increased by $r\ (\delta g_z/\delta y)$. In like manner the moment about the plus x axis would be $+rm\ (g_o + r\ \delta g_z/\delta y)$. The addition of these two nearly equal but opposite moments leaves small residual moment $2\ mr^2\ (\delta g_z/\delta y)$. This result is seen to be in agreement with Equation (16).

Measurement of the desired component or combination of components of the gravity gradient, as for example the gravity gradient $(\delta g_z/\delta y)$ expressed in Equation (16), is effected by a highly precise and sensitive capacitive suspension system. A known value for torque moment $M_x$ is applied about the x axis of symmetry to counteract the torque moment experienced from the gravity gradient. Failure of the known torque moment to perfectly conteract the gravity gradient torque moment results in angular acceleration of float 100 relative to case 10 about the x axis of symmetry. This angular acceleration results in an angular displacement of float 100 relative to case 10 about the x axis. The angular displacement, in turn, is sensed and used in a feedback loop to control the known applied torque moment $M_x$. The feedback loop maintains the angular displacement of float 100 at a negligibly low level, thereby establishing the equivalences of the average of the known torques and the average of the gradient torques.

Figure 3:
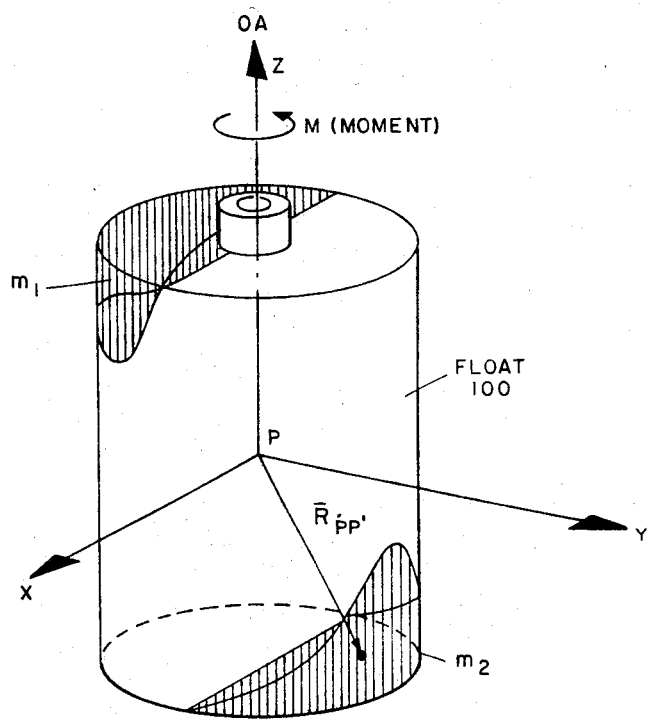
FIG. 3 is a cutaway view of the float component of the gradiometer having, as an alternate embodiment, a skewed-mass configuration.

Prior to discussing the suspension system and the other components comprising the instrument, Applicant notes that alternative mass configurations, in addition to the axially symmetric design, are contemplated within the scope of the invention FIG. 3.

FIG. 3, for example, shows masses $m_1$ and $m_2$ in a skewed rather than axially symmetric configuration. Again, the mass configuration is designed and balanced to accurately meet the conditions of Equation (12). For the configuration as shown in FIG. 3, the conditions analogous to those of Equation (15) become $$I_{yy} - I_{xx} = -\text{substantial value}$$

$$I_{xy} = 0$$

$$I_{zx} = 0$$

$$I_{yz} = -\text{substantial value} \quad (17)$$

Desired components of the gravity gradient produce a torque moment about the axis of symmetry, z, according to Equation (13).

$$M_z = -(\delta g_z/\delta x) I_{yz} + (\delta g_y/\delta x)(I_{yy} - I_{xx}) \quad (18)$$

When this configuration is used to indicate gravity anomaly gradients, its axis of cylinder is mounted vertically on the stabilized platform. Three of these gradiometers are used in the system.

Figure 4:
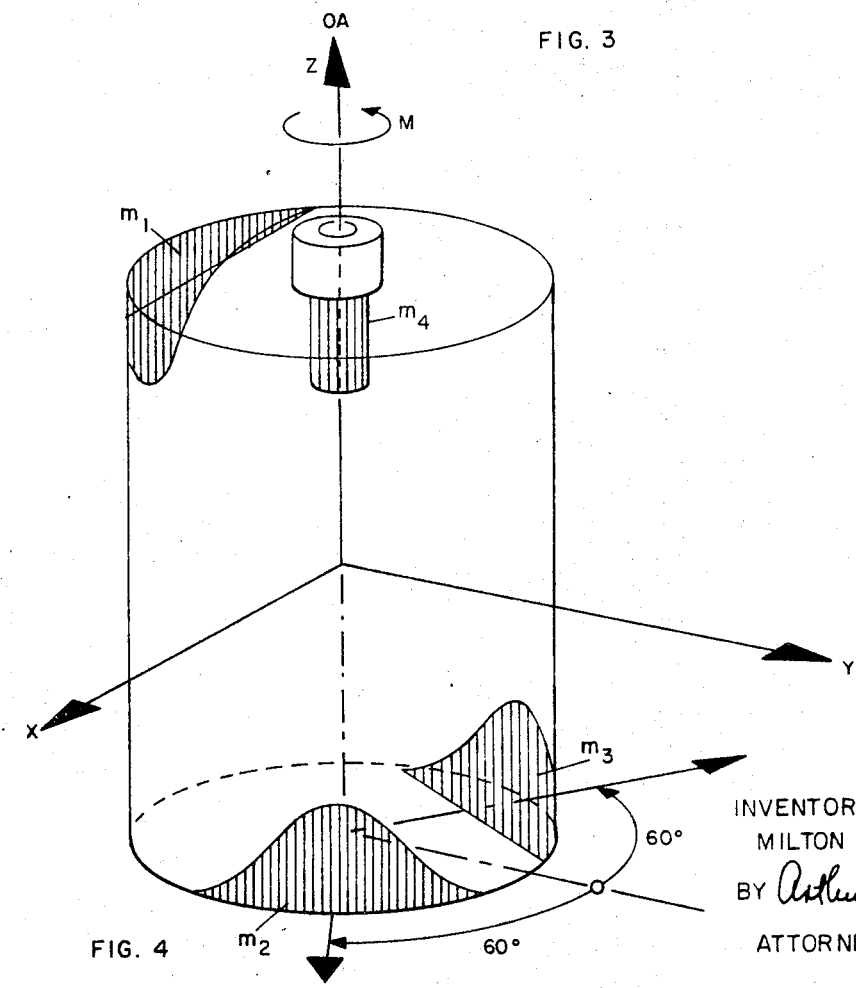
FIG. 4 is a cutaway view of the float component of the gradiometer having, as an alternate embodiment, a configuration employing four masses.

Another alternative mass configuration is shown in FIG. 4. As noted therein, four masses are employed. Masses $m_1$, $m_2$ and $m_3$ of equal weight and identical configuration are located at the edges of the float casing.

A fourth equal mass $m_4$ is necessary to meet the conditions of Equation (12). For the configuration as shown in FIG. 4, the conditions analogous to those of Equation (15) become $$I_{yy} - I_{xx} = 0$$

$$I_{xy} = 0$$

$$I_{zx} = 0$$

$$I_{yz} = -\text{substantial value} \quad (19)$$

A desired component of the gravity gradient produces a torque moment about the axis of symmetry, z, according to Equation (13).

$$M_z = -(\delta g_z/\delta x) I_{yz} \quad (20)$$

Where this type configuration is used in an inertially stabilized system to indicate gravity anomaly gradients, its axis of cylinder is mounted vertically on the stabilized platform. Two of these gradiometers are used in the system.

The advantages of these various mass configurations depend on the type of stabilized system within which the instrument is incorporated and the particular task to be performed. Typical system applications are described later in these specifications.

In the preferred embodiment the float structure is made of beryllium except for the masses. Beryllium provides high stability. Its good thermal conductivity characteristics help to attenuate gradients. The weights or masses are made of spent uranium which has the advantage of high density and a thermal coefficient of expansion close to that of beryllium.

Figure 5:
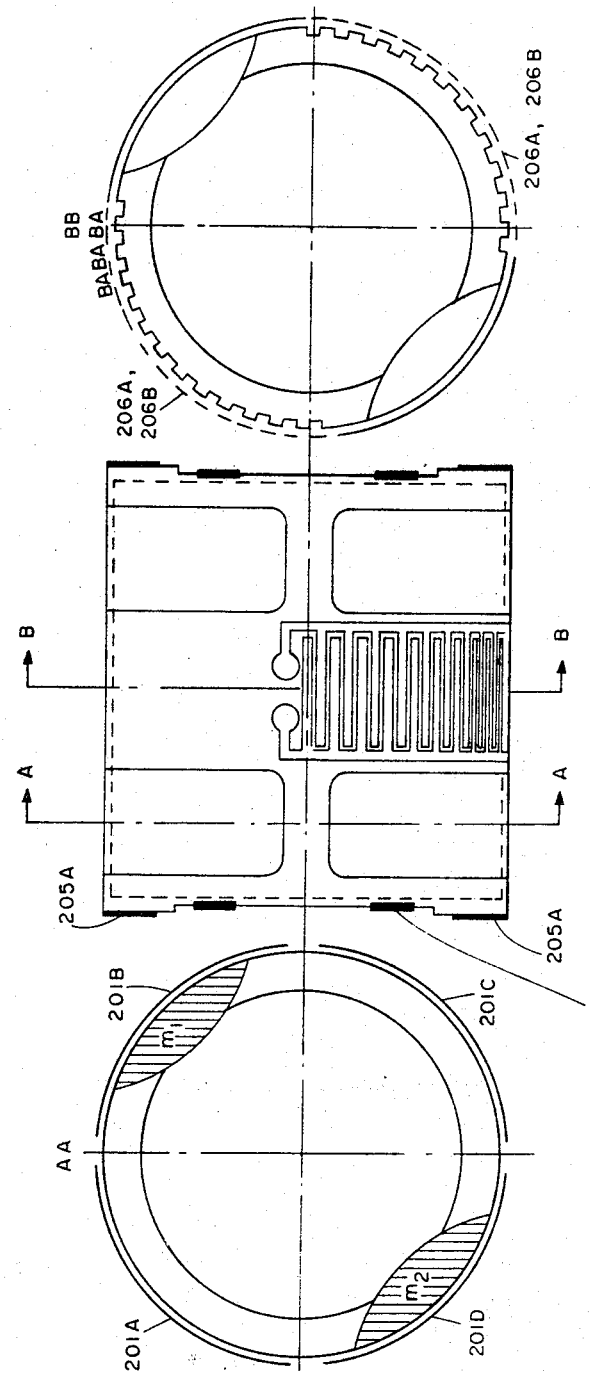
FIG. 5A depicts four radial suspension electrodes constituting a portion of the instrument's capacitive suspension system.
FIGS. 5B and 5C are cross-sectional views of the axial suspension electrodes constituting a portion of the instrument's capacitive suspension system.

As aforementioned, float 100 is supported within outer case 10 via a capacitive suspension system which provides support in six degrees of freedom and which both senses displacement of the float from null and acts to restore same. A cross-sectional view of float 100 showing the suspension elements is depicted in FIGS. 5A, 5B, 5C. As illustrated in FIG. 5A, electrodes 201A through 201D are disposed about one end of float 100 for radial suspension thereof. Likewise, four other electrodes 203A through 203D, not shown, are similarly disposed about the other end of float 100 for radial suspension. Axial suspension is effected by electrodes 205A and 205C shown in FIG. 5B and, for suspension about the output axis of float 100, by electrode array 206A, 206B shown in FIG. 5C. The electrodes affixed to inner surface of case 10 are used in pairs, the electrodes in a pair being excited with an alternating voltage of equal magnitude but opposite polarity. Electrode array 206A, 206B comprise a series of alternately arranged plates A and B, all of the A plates being coupled together in parallel and all of the B plates likewise connected in parallel, the A and B plates being excited with alternating voltage of equal magnitude but opposite polarity. (Plates 230A and 230B in FIG. 5B form common 230 which is used in all channels. These plates are coupled in parallel.)

Figure 6:
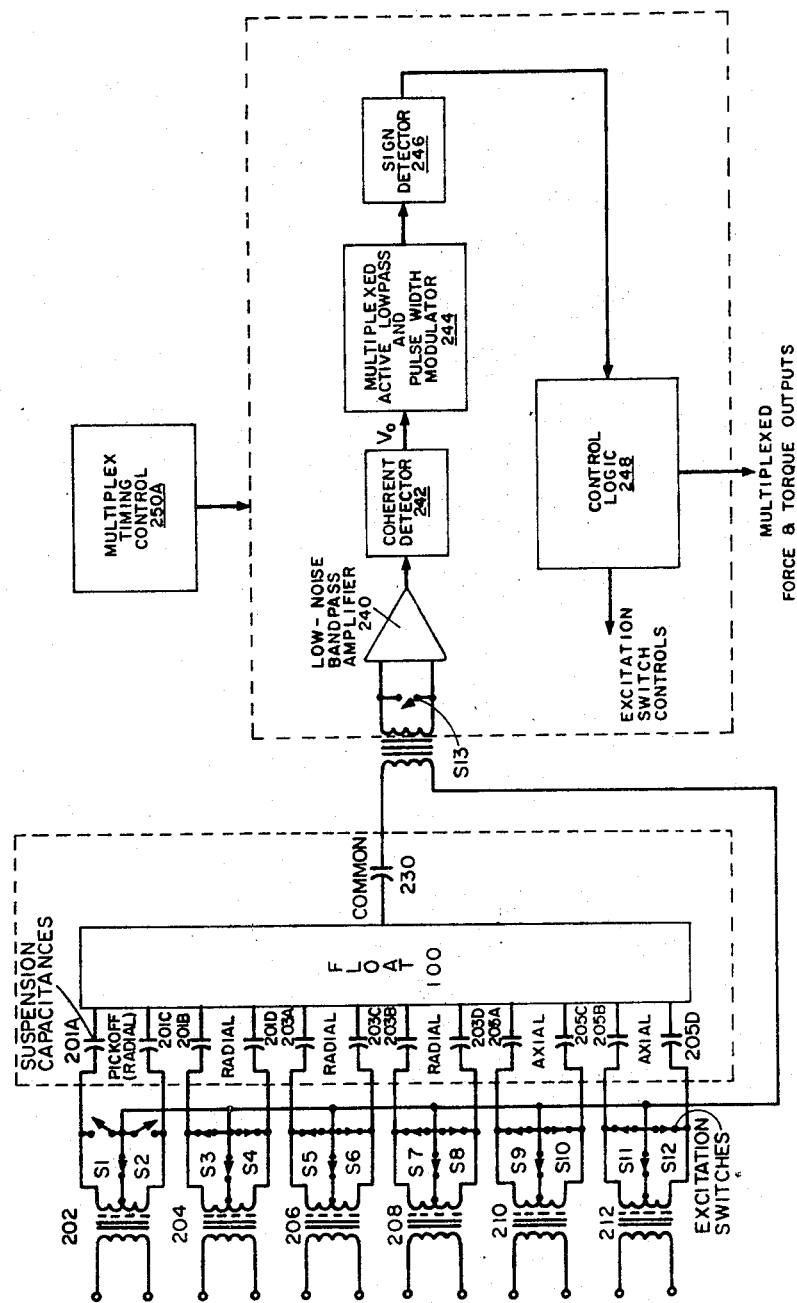
FIG. 6 is a block diagram of the gradiometer's capacitive suspension system.

To illustrate the operation of the system, a simple single-axis case involving suspension along a radial degree of freedom is now described with reference to FIG. 5A and FIG. 6. As noted in FIG. 6, switch S13 is open, indicating the system is in a readout or sensing mode; switches S1 and S2 are open, indicating that the capacitances of electrode pair 201A and 201C are to be read out; and switches S3 through S12 are closed or grounded, allowing no readout of the electrodes associated therewith.

As noted in the figures, diametrically opposite electrodes 201A and 201C are excited with center tapped transformer 202. With float 100 exactly centered between the two electrodes (i.e., at its null position), the capacitances measured across both electrodes are equal in magnitude but of opposite polarities (i.e., electrode 201A is, say, positively charged while electrode 201B is negatively charged). Hence, no voltage is read across common 230, i.e., $v_o = 0$.

As float 100 begins to move closer to one of the plates, the capacitance on one electrode increases while that on the other electrode decreases, and potential changes are induced on the float, resulting in an alternating voltage across common 230, this voltage having a phase and amplitude proportional to this difference or potential. This "difference signal" $V_o$ is amplified by low-noise bandpass amplifier 240 and sensed by coherent detector 242.

The voltage $V_o$ is integrated and stored by low-pass filter 244. The sign of $V_o$ is detected via detector 246 and this resulting sign information is transmitted to control logic 248. The control logic, comprising known logical gating components, initiates the restoring or torque mode which acts to restore float 100 to its null position of equilibrium relative to the electrode pair 201A/201C. In establishing the torque mode the control logic causes low-pass filter 244 to function as a pulse width modulator. The stored $V_o$ data determines the duration of the restoring torque pulse applied to the plates through the control logic.

The torquing or restore mode is illustrated for the aforementioned simple single-axis case, again with reference to FIG. 6. Assume, now, that signal $V_o$ had indicated during the aforementioned sensing mode that float 100 had been displaced from null toward electrode 201C. In this case control logic 248 generates a series of signals ensuring that switches S3 through S12 have remained closed (grounded), a signal closing switch S2 (grounding electrode 201C), and a signal closing switch S13 (grounding common 230). The logic then causes a voltage to be applied between ground and plate 201A, the duration of the voltage application being proportional to the float's displacement from null, i.e., proportional to $V_o$ measured during the sensing mode. The relatively high electric field strength between plate 201A and float 100 results in an attraction of said float toward the plate, thereby returning the float to null.

All six degrees of freedom are sensed and torqued cyclically in a manner identical to that described above. For example, the suspension capacitances across electrodes 201B/201D are sensed, and a restoring torque applied if necessary. The capacitances across electrodes 203A/203C are then sensed, and a restoring torque applied, and so on through the entire cycle when the operation then repeats. The cyclic operation is controlled by timing signals from multiplex timing control logic 250A. In the preferred embodiment each degree of freedom undergoes a sense-force cycle four times per second.

A moment about the float's axis of cylinder (output axis), representing the gravity gradient to be measured, is sensed exactly as described above. The electrode configuration, however, physically differs somewhat from the other radial/axial electrode pairs, although electrically they are identical. Referring back to FIG. 5B and 5C, a pair of diametrically arranged plate arrays 206A and 206B is incorporated within the inner surface of case 10. On the outer surface of float 10 and in the same path of revolution of the plate arrays is a circuit array 207. The plate arrays comprise alternately disposed plates A and B, the A plates all being connected together in parallel and the B plates all being parallel connected, forming, in effect, electrode pair 206A and 206B excited by center tapped transformer 212 shown in FIG. 6. Circuit array 206A, in turn, comprises two parallel connected clockwise circuits circuit array 206B comprises two parallel connected counter-clockwise circuits. Circuit array 207 is physically formed by alternately disposed epoxy (or other insulating material) filled slots and unmilled float sections.

As float 100 rotates about its output axis responsive to a moment induced thereon by the component of gravity gradient being measured, the position of the plates relative to the circuit array of slots changes, and, as before, the capacitance on an electrode increases (as, for example, sum of capacitances on the A plates) while that on the other electrode decreases (as, for example, sum of capacitances on the B plates). This, as before, results in an alternating voltage having a phase and amplitude proportional to the difference in capacitances. This voltage is sensed in the manner previously described, and the torquing mode is likewise the same.

The action of the multiplex pulsed suspension is equivalent to suspending each of the six degrees of freedom with a continuously operating damped second order torque feedback loop. Voltage $V_o$ corresponds to the displacement in the degee of freedom. The displacement is applied to the float as a restoring acceleration by periodic pulses of duration proportional to $V_o$ and of appropriate amplitude. The resulting float-to-case relative velocity is opposed by the viscous action of the suspension fluid which provides loop damping. The geometry and the suspension fluid viscosity result in overdamped loop characteristics for the five non-symmetric degrees of freedom. The symmetric degree of freedom can be given a loop frequency near one cycle per minute with a damping ratio near one-half critical by the proper selection of gains. A low frequency is selected for this loop to minimize the effects of noise.

The signal representing the known torque moment applied about the float's output axis, in addition to its use in restoring the float, is also fed out from control logic 248 during each cycle. This signal is the output of the gradiometer. This indicated gradient signal is accurately integrated from cycle to cycle. The accuracy of this integral, or of an average derived from it, determines the accuracy of gravity anomaly indication and, hence, of system performance. In the preferred embodiment the signal representing the known applied torque is clean and at a relatively high voltage level. This is true even if the sensing channels are noisy. Therefore, noise in the sensing cycle negligibly affects the accuracy of the measurement of the average integrated gradient and, hence, of the indicated gravity anomaly.

The signal representing the known torque moment is applied about the output axis of the float by means of stable capacitive geometry and stable voltage. The input gradient acts on a stable inertia configuration to produce a second torque on the float. The float accurately sums these two torques plus the torque from the viscosity of the suspension fluid. The action of the aforementioned torque feedback loop maintains the angular displacement and the angular velocity of float 100 relative to case 10 at negligibly low levels, thus accurately maintaining the integral of the above-mentioned sum at a near zero value. Thereby the equivalence is established of the average or integral of the known applied torque to the average or integral of the gradient torque.

In the preferred embodiment a 20-volt excitation is available for the electrodes. This voltage level is sufficient to enable the capacitive suspension to operate in the presence of the initial coarse float unbalances. (As explained later in the specification, the suspension system is used in the fine balancing procedure for measuring unbalances.) As the unbalance is reduced, this voltage is decreased in several steps. One-volt excitation is sufficient to suspend the float when the unbalances are at the millidyne cm. level, i.e., during actual operation of the instrument.

Sensing is accomplished with approximately the same excitation on the plates as for forcing. A low noise sensing amplifier is employed for this purpose. In the preferred embodiment it is designed to sense 0.2 seconds of arc with reasonable signal-to-noise level given a capacitor excitation of one volt.

Figure 7:
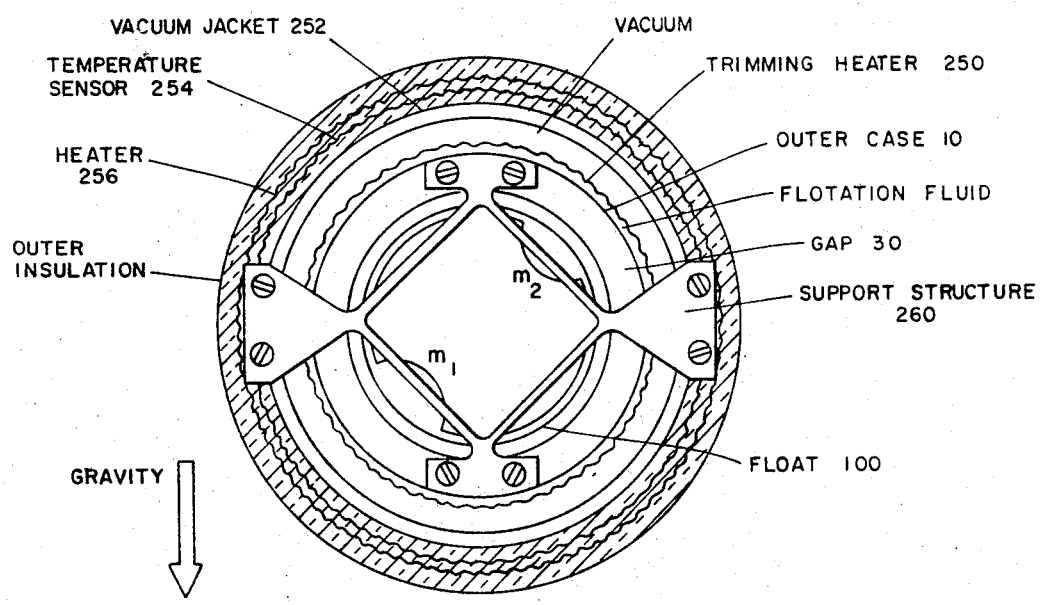
FIG. 7 depicts the thermal system for the gradiometer.

The thermal configuration of the gradiometer is shown in FIG. 7. Shown therein is float 100 (containing masses $m_1$ and $m_2$) surrounded by flotation fluid in gap 30. The flotation fluid, in turn, is contained by the thick beryllium walls of outer case 10. Around case 10 are depicted portions of trimming heater windings 250, which are used to dissipate approximately a milliwatt to maintain a controlled temperature difference of nominally 0.5°F between case 10 and vacuum jacket 252.

Vacuum jacket 252 is a thick-walled aluminum structure. The inside of vacuum jacket 252 and the outside of case 10 are both gold plated to minimize radiation heat exchange. Arranged around the outside of vacuum jacket 252 are sensor windings 254, heater windings 256 and a layer of insulation 258. In the preferred embodiment, the average temperature of the outer surface of vacuum jacket 252 is controlled to an accuracy of 0.001°F.

Case 10 is supported inside vacuum jacket 252 by means of relatively thin struts in tension. The strut configuration is a square, two opposite corners of which are supported by vacuum jacket 252, and the other two corners of which support case 10. These struts are carefully matched in cross section so that the support configuration 260 acts like a thermal wheatstone bridge. The heat from a temperature gradient across the diameter of vacuum jacket 252 is carried equally in the two branches of the strut network. Thus, a temperature null exists across the attachment points on case 10.

The objective of the thermal configuration is to provide float 100 and fluid 30 with a high degree of isolation from environmental thermal gradients. It is calculated that vacuum jacket 252 will have a gradient of approximately 0.1°F when protected by outer insulation 258. It is further calculated that the aforementioned vacuum jacket gradient will transfer heat by radiation which results in an outer case 10 thermal gradient of a fraction of a micro °F. Such case thermal gradient, when transmitted to the fluid, causes an acceptably small balance change to result from the differential expansion of the fluid and the float.

Further, in the preferred embodiment, a precise thermal control system is incorporated into the thermal configuration. The thermal control system has two objectives: the correct temperature for neutral buoyancy must be established in suspension fluid 30 with an accuracy of ten micro °F when the capacitive suspension is operated at its lowest excitation of one volt; very slow rates of change in absolute temperature for required in the float fluid and outer case to assure sufficiently small thermal gradients.

Temperature sensing for the above-mentioned thermal control is based on the very sensitive effect of float net weight change with temperature. The fluid expands at a much faster rate than the float as temperature is increased. The result is increasing net weight of the float in the fluid with increasing temperature. Hence, the same capacitive suspension system used to measure gravity gradient torques is also employed, during other portions of the multiplex cycle, to measure the float suspension forces. This data, in turn, is an extremely accurate indication of float net weight in the fluid and is used to modulate inner heater power by a fraction of a milliwatt, allowing extremely precise temperature control.

For the preferred embodiment, the thermal control feedback loop has a bandwidth of roughly one cycle per hour. This is slow compared to the time lags in the weighing circuits, but fast compared to the 50- or 60-hour time constant given by the quotient of the main housing thermal inertia divided by the conductance of the struts. Temperature fluctuations of the vacuum jacket are attenuated by a factor of 400 in the critical frequency range of ¼ to 1 cycle per hour. Average vacuum jacket temperature control with an accuracy of 0.002°F combined with said attenuation achieves the desired buoyancy balance.

The accuracy of instrument operation is also predicted to a large extent on proper balancing of the float prior to instrument use.

Briefly, coarse balance of float 100 is accomplished down to the level of several dyne-centimeters before the float is assembled within outer case 10. Using the suspension systems previously described along with known sputtering techniques, fine balancing is then effected to reduce any unbalance between the center of mass and the center of buoyancy of the float. The sputtering techniques are employed to translate mass within the float to effect the desired balance.

Alternative Float Configuration

Figure 8:
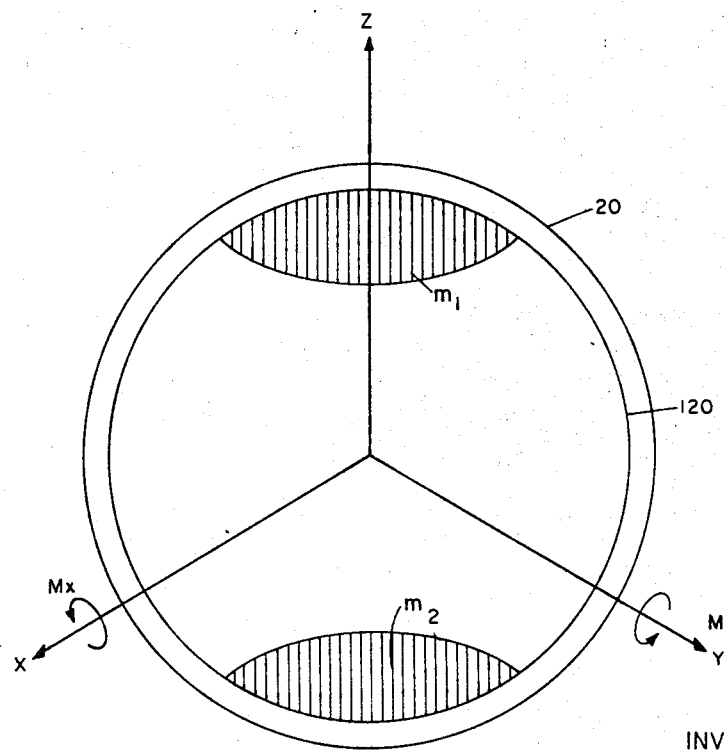
FIG. 8 shows an alternate embodiment of the gradiometer instrument employing a spherically configured float.

Alternate float configurations are also contemplated within the scope of the invention. FIG. 8 shows an alternate embodiment where the gradiometer comprises spherical outer case 20 within which is suspended spherically configured float 120. The mass is concentrated in two pellets $m_{10}$ and $m_{20}$ on the opposite ends of a diameter. This configuration has two axes of symmetry along $x$ and along $y$ in FIG. 8. Consequently, two independent components or combinations of components of the gravity gradient can be measured simultaneously with a single instrument.

The spherical float is supported by its buoyancy in the suspension fluid. This fluid is contained in the small clearance 25 between float and spherical housing in excatly the same manner as in the preferred embodiment. Similarly, a capacitive suspension system senses displacements and imposes small trimming forces in six degrees of freedom. A re-arrangement of the electrodes of the preferred embodiment is necessary to accommodate the spherical geometry. The gravity gradient components are again indicated by the measured torque moments required about the $x$ and the $y$ axes to prevent relative motion between the float and the housing.

The spherical configuration is designed and balanced so that its mass configuration accurately meets the conditions of Equation (12). For the configuration shown in FIG. 8, the conditions analogous to those of Equation (15) become $$I_{zz} - I_{yy} = - \text{substantial value}$$
$$I_{xx} - I_{zz} = + \text{substantial value}$$
$$I_{xy} = 0$$
$$I_{yz} = 0$$
$$I_{zx} = 0 \tag{21}$$

The desired components of the gravity gradient produce torque moments about the $x$ and $y$ axes of symmetry, respectively, according to Equation (13).

$$M_x = (\delta g_z/\delta y)(I_{zz} - I_{yy})$$
$$M_y = (\delta g_z/\delta x)(I_{xx} - I_{zz}) \tag{22}$$

Where this spherical configuration is used in a gyroscopically stabilized system to indicate gravity anomaly gradients, it is mounted on the stabilized platform with the weight in a vertical line. One gradiometer is used in the system.

System Configuration

The gradiometer instrument described in these specifications is designed for use in a gyroscopically stabilized gravity gradient measuring system for operation in a moving vehicle. Prior to describing the preferred embodiment of such a system, the mathematical framework within which the system is designed to function is briefly presented.

Free Air Gravity Anomaly Indication

As aforementioned, the free air gravity anomally, $\Delta g_{ea}$, is to be indicated or measured. The free air gravity anomaly is the magnitude of the actual gravity vector, $\vec{g}_a$, less the magnitude of the reference gravity vector, $\vec{g}_e$. The actual gravity vector at some point is that which could be measured by an instrument at rest with respect to the earth. The reference gravity vector is defined by some reference gravity model such as the International Gravity Formula and the International Ellipsoid (subscript "e" denotes ellipsoid).

The measured gravity anomaly, $\Delta g_{em}$, is intended to represent the free air gravity anomaly, $\Delta g_{ea}$. These quantities differ because of instrumental errors and approximations.

The values of $\Delta g_{ea}$ and $\Delta g_{em}$ change with time as the sampling point moves with velocity $\vec{v}$ relative to the earth. Let $\vec{R}$ be a unit vector along the z axis which is upward along the local vertical. Then, $$-\Delta g_{ea} = \vec{R} \cdot \vec{g}_a - \vec{R} \cdot \vec{g}_e \tag{23}$$
$$-\Delta g_{em} = \vec{R} \cdot \vec{g}_m - \vec{R} \cdot \vec{g}_e \tag{24}$$

Taking time derivatives of the above, $$-(d\Delta g_{ea}/dt) = (d\vec{R}/dt) \cdot \vec{g}_a + \vec{R} \cdot (d\vec{g}_a/dt) - (d\vec{R}/dt) \cdot \vec{g}_e - \vec{R} \cdot (d\vec{g}_e/dt) \tag{25}$$
$$-(d\Delta g_{em}/dt) = (d\vec{R}/dt) \cdot \vec{g}_m + \vec{R} \cdot (d\vec{g}_m/dt) - (d\vec{R}/dt) \cdot \vec{g}_e - \vec{R} \cdot (d\vec{g}_e/dt) \tag{26}$$

Let the gradient of the actual gravity vector, the gradient of the reference gravity vector, and the gradient of the measured gravity vector be represented respectively by dyadics $G_a$, $G_e$ and $G_m$. Each dyadic has for components terms like $\vec{R}\vec{R}$ ($\delta g_{az}/\delta z$) and $\vec{R}\vec{i}$ ($\delta g_{az}/\delta x$) for components. The following differential equations follow from the definitions:

$$(dg_a/dt) = G_a \cdot \vec{v} \tag{27}$$
$$(dg_e/dt) = G_e \cdot \vec{v} \tag{28}$$
$$(dg_m/dt) = G_m \cdot \vec{v} \tag{29}$$

Substitute (27), (28) and (29) into (25) and (26), $$-(d\Delta g_{ea}/dt) = \vec{R} \cdot [(G_a - G_e) \cdot v] + (d\vec{R}/dt) \cdot (\vec{g}_a - \vec{g}_e) \tag{30}$$
$$-(d\Delta g_{em}/dt) = \vec{R} \cdot [(G_m - G_e) \cdot v] + (d\vec{R}/dt) \cdot (\vec{g}_m - \vec{g}_e) \tag{31}$$

Equation (31) could be implemented completely to indicate the gravity anomaly. The components of $G_m$ are measured by instruments which are mounted on a stabilized platform. The components of $\vec{v}$ can be resolved in this platform space. A scheme can be devised to keep this platform precisely aligned with local vertical $\vec{R}$. Thus the $\vec{R} \cdot [G_m \cdot v]$ term can be computed.

$G_e$ is determined in a space whose vertical axis is normal to the ellipsoid. To transform $G_e$ into platform space requires knowledge of the vertical deflection. A scheme can be devised to accurately indicate this. The same type of vertical deflection data is necessary for the computation of the last term of (31). Such a system requires five axially symmetric gravity gradiometers, for example, and very precise gyroscopes and accelerometers.

The above complete implementation of Equation (31) indicates a different free air gravity anomaly than is ordinarily used. The free air reduction for this anomaly is based on elevations relative to the reference ellipsoid. The common free air reduction is based on elevations relative to sea level or the geoid. The two differ by the product of the vertical gravity gradient times the local geoid height.

Consider the following modification to Equation (31). Drop entirely the $(d\vec{R}/dt)$ term. Bodily rotate $G_e$ (not transform) from the ellipsoid space to the local vertical space. There are three reasons for this modification. First, the dropped term and the erroneous transformation are equivalent to gradiometer instrument errors of only ⅓ Eötvös unit when the deflection of the vertical is 20" arc. This abridgement is a reasonable approximation since its error is comparable to that expected from the instruments. Second, the system complexity is reduced by not adding gradiometers to indicate vertical deflection. Third, it can be shown that the resulting equation almost perfectly gives the free air gravity anomaly as it is commonly defined. Dropping the term and erroneously transforming are what is required to account for the geoid height and the vertical gradient.

Equation (31) becomes:
$$-(d\Delta g_{em}/dt) = \vec{R}\,[(G_m - G_e)\cdot\vec{v}] = \vec{R}\cdot[\Delta G_{em}\cdot\vec{v}] \quad (32)$$

with a slightly different definition for $\Delta g_{em}$ and $G_e$. In scalar form Equation (32) is $$\Delta g_{em} = \Delta g_{em_0} +$$
$$\int [v_x\,(\delta g_{mz}/\delta x - \delta g_{ez}/\delta x) + v_y\,(\delta g_{mz}/\delta y - \delta g_{ez}/\delta y) + v_z\,(\delta g_{mz}\delta z - \delta g_{ez}/\delta z)]\,dt \quad (33)$$

Figure 9:
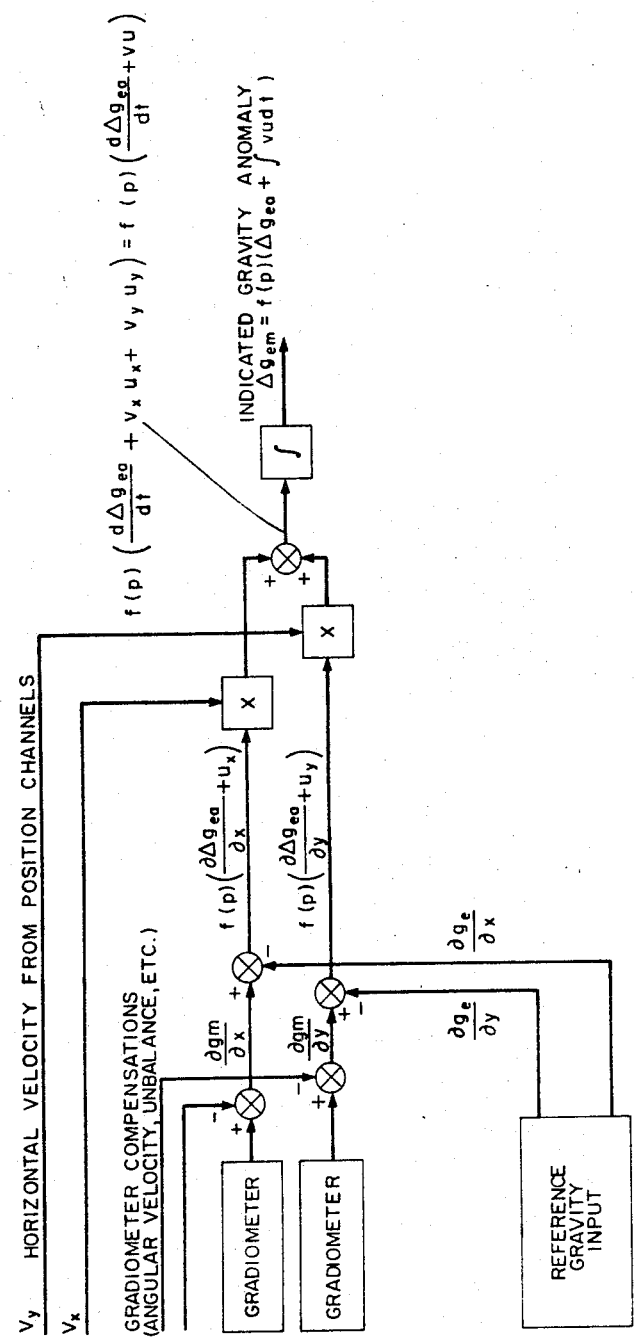
FIG. 9 is a flow diagram showing an instrumentation of the basic gradiometer system equation.

A block diagram for implementing Equation (33) is shown in FIG. 9, using two gradiometers in a system. The gradiometer information is first compensated for known effects. Gradients are accurately calculated from the reference gravity model and subtracted from the gradiometer information. The resulting components of the measured gravity anomaly gradient are multiplied by components of velocity and summed. This sum is the time rate of change of the free air gravity anomaly. Integration gives the indicated anomaly.

In FIG. 9 the $v_z$ term of Equation (33) has been dropped, thereby obviating the need for one or more additional gradiometers. This should be acceptable for most gravity surveying applications. For example, in a survey made by an aircraft at low altitude above relatively flat terrain, it should be feasible to fly the aircraft at constant altitude to within 50 feet for a distance of a mile or so. Gravity anomaly gradients typically have an order of magnitude of 30 Eötvös units. The product of altitude change times the gradient gives the order of magnitude of the potential error from dropping the $v_z$ term. This error is the same as would result from a gradiometer error of ⅓ Eötvös unit over a mile of traverse, or approximately 0.05 milligals.

Preferred System Embodiment

Figure 10:
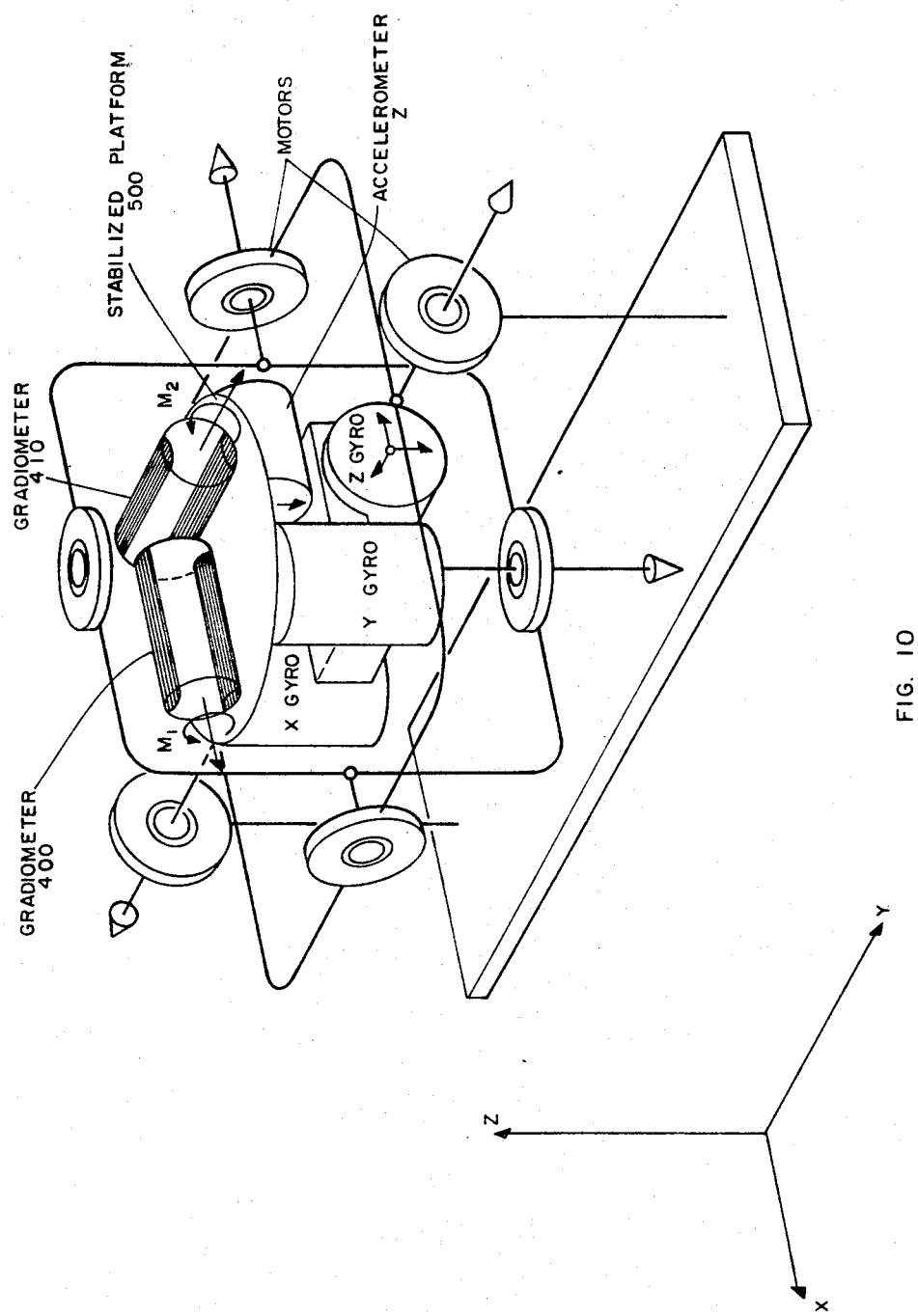
FIG. 10 depicts a gyroscopically stabilized system employing two gradiometers having axially symmetric mass configurations.

The preferred embodiment of the gravity anomaly surveying system is shown in FIG. 10. As noted therein, the system comprises two axially symmetric gradiometers 400 and 410 mounted on stabilized platform 500. Defining mutually orthogonal platform axes $x$, $y$ and $z$, where $z$ is along the vertical, the two gradiometers are arranged on the platform such that the output axis of gradiometer 400 is coincident with platform axis $x$ and the output axis of gradiometer 410 is coincident with platform axis $y$. In other words, the axes of cylinder of the axially symmetric gradiometers are in the horizontal plane defined by the stabilized platform but at right angles to each other.

The moments measured by gradiometers 400 and 410 according to Equation (13) become:

$$M_1 = -(\delta g_z/\delta y)(I_{yy} - I_{zz})\ \text{for gradiometer 400}$$

$$M_2 = +(\delta g_z/\delta x)(I_{xx} - I_{zz})\ \text{for gradiometer 410} \quad (34)$$

The platform is stabilized using state-of-the-art techniques for inertial systems, but with precision design to minimize errors in gradient resolution, noise and jitter. Three gyroscopes, Gyro X, Gyro Y and Gyro Z, are mounted with input axis along the three platform axes while two or three accelerometers (only one of which, the z accelerometer, is shown) are likewise incorporated into the platform, all in accordance with known inertial design techniques which are not detailed here. Platform 500 is supported by gimbals relative to the vehicle transporting the system. The gimbals provide three or four angular degrees of freedom between the platform and vehicle. The gyros measure errors in platform orientation. Stabilization servos are employed to null the gyro errors by applying torques to the platform about the gimbal degrees *freedom by means of motors*.

Alternate System Embodiments

Figure 11:
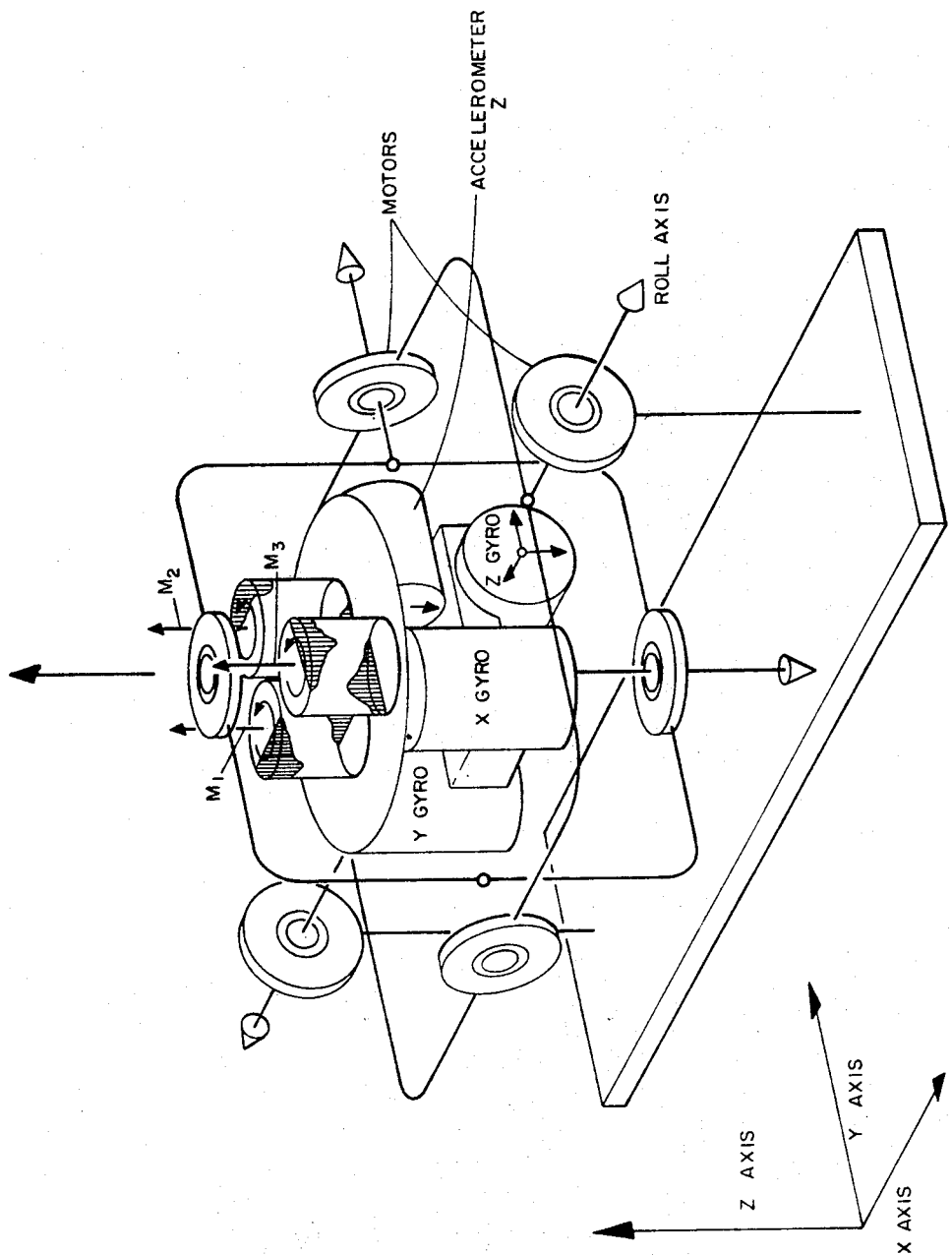
FIG. 11 depicts a gyroscopically stabilized system employing three gradiometers having skewed-mass configurations.

Alternate arrangements of gradiometer components are contemplated in the system of the invention. In the alternate embodiment of FIG. 11, three skewed mass gradiometers 420, 440, and 460 are employed in place of the two axially symmetric gradiometers of the aforementioned preferred system embodiment. In all other respects, the system of FIG. 11 is identical to that of the preferred embodiment of FIG. 10.

The moments measured by gradiometer 420, 440, and 460 according to Equation (13) become:

$M_1 = -(\delta g_z/\delta x)\,I_{yz} - (\delta g_y/\delta x)(I_{xx} - I_{yy})$ for gradiometer 420

$M_2 = -(\delta g_z/\delta x)\,I'_{yz} - (\delta g_y/\delta x)(I'_{xx} - I'_{yy})$ for gradiometer 440

$M_3 = (\delta g_z/\delta y)\,I''_{xy} + (\delta g_y/\delta x)(I''_{yy} - I''_{xx})$ for gradiometer 460 (35)

The fradient component $(\delta g_y/\delta x)$ affects each of the three moments and is unwanted for gravity anomaly indication. As such, this unwanted component can be eliminated from the above set of moment equations by proper mathematical techniques, leaving the desired components $(\delta g_z/\delta x)$ and $(\delta g_z/\delta y)$ determined by combinations of the measured moments as $$(\delta g_z/\delta x) = (1/I_p)(M_1 - M_2/2)$$

$$(\delta g_z/\delta x) = (1/I_p)(M_3 + M_1 + M_2/2)$$

where $_p$ is the nominal magnitude of the product of inertia.

Another alternative system arrangement of gradiometers uses two gradiometers having the mass configuration depicted in FIG. 4 mounted with output axes along the z axis of stabilized platform 500.

A further alternate embodiment uses one spherical gradiometer of the type shown in FIG. 8 on stabilized platform 500. The moments measured about the $x$ and $y$ gradiometer axes give directly the desired gradient components $(\delta g_z/\delta x)$ and $(\delta g_z/\delta y)$.

Deflection of the Vertical Indication

The vertical deflection is the deviation of the direction of the critical gravity vector, $\bar{g}_a$, from the direction of the reference gravity vector, $\bar{g}_e$. The two components of the vertical deflection can be considered the consequence of the two horizontal components of the deviation of gravity from its reference value. The vertical deflection is accurately computed from knowledge of these two horizontal components of the gravity deviation and an approximate value for the magnitude of gravity.

The horizontal components of the gravity disturbance are measured by a gravity gradiometer system in a manner similar to that described previously in the specification for measuring the vertical component of the gravity deviation when indicating the free air gravity anomaly. A mathematical framework for indicating these horizontal components of gravity deviation is closely analogous to that presented for the vertical component. The gravity gradient components necessary to measure for these two horizontal components are $(\delta g_x/\delta x)$, $(\delta g_y/\delta y)$, and $(\delta g_y/\delta x)$ defined in the same orthogonal axes $x$, $y$, and $z$ with $z$ being along vertical.

Figure 12:
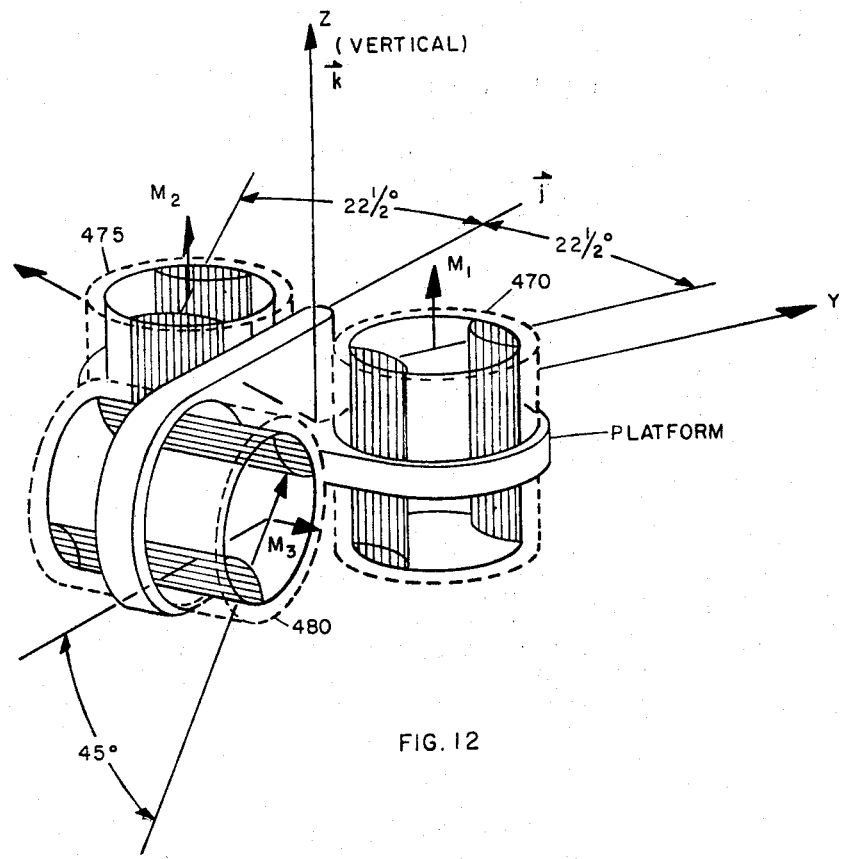
FIG. 12 depicts a system employing three gradiometers having axially symmetric mass configurations.

Three axially symmetric gradiometers 470, 475 and 480, mounted on gyroscopically stabilized platform 500, are used to measure these gravity gradient components. This configuration is shown in FIG. 12. As shown the output axis of gradiometers 470 and 475 are aligned along the vertical while that of gradiometer 480 is aligned orthogonal thereto. The platform itself is stabilized identical to that of FIG. 10.

The moments measured by gradiometers 470, 475 and 480 according to Equation (13) become
$M_1 = (\delta g_y/\delta x)(I_{yy} - I_{xx})$ for gradiometer 470.
$M_2 = (\delta g_y/\delta y - \delta g_x/\delta x) I'_{xy}$ for gradiometer 475.
$M_3 = (\delta g_{x'z}/\delta_{xz} - \delta g_z/\delta x) I'_{zx'}$ for gradiometer 480.

The undesired gradient component $(\delta g_z/\delta z)$ is eliminated by the use of the well known Poison's equation written in a space which rotates with the angular velocity of the earth, $\bar{W}_{IE}$.

$$(\delta g_x/\delta x) + (\delta g_y/\delta y) + (\delta g_z/\delta z) = 2W_{IE}^2 - 4\pi Rp$$

where $p$ denotes the density of the medium and where $R$ denotes the universal gravitational constant.

The gravity gradient component $(\delta g_{x'}/\delta x')$ can be transformed through an angle of 22.5° to give in the unprimed coordinate system
$\delta g_{x'}/\delta x' = \frac{1}{2}(\delta g_y/\delta y + \delta g_x/\delta x) - 1/2 \sqrt{2}(\delta g_y/\delta y - \delta g_x/\delta x) + 1/\sqrt{2}(\delta g_y/\delta x)$ The set of equations giving the moments together with Poison's equation and the aforementioned transformation can be solved together to give the desired gravity gradient components explicitly. Note that nominally $$\Delta I = I_{yy} - I_{xx} = 2I'_{x'y} = -2I''_{z'x'}$$

then, $$(\delta g_y/\delta x) = (M_1/\Delta I)$$

$$\frac{1}{2}(\delta g_y/\delta y - \delta g_x/\delta x) = (M_2/\Delta I)$$

$\frac{1}{2}(\delta g_y/\delta y + \delta g_x/\delta x) = -\frac{2}{3}(M_3/\Delta I) + 1/3\sqrt{2}(M_2 - M_1/\Delta I \gamma) + \frac{1}{3}(2W_{IE}^2 - 4\pi Rp)$ Alternate gradiometer system configurations for vertical deflection indication are contemplated and are within the scope of the invention. Skewed mass configuration gradiometers or spherical gradiometers can be used in various orientation combinations on stable platform 500 to accomplish the measurement of the required three gradient components.

Combined System

A system to indicate both vertical deflections and free air gravity anomaly is obtained by mounting the axially symmetric gradiometer clusters shown in FIGS. 10 and 12, together on stable platform 500.

Figure 13:
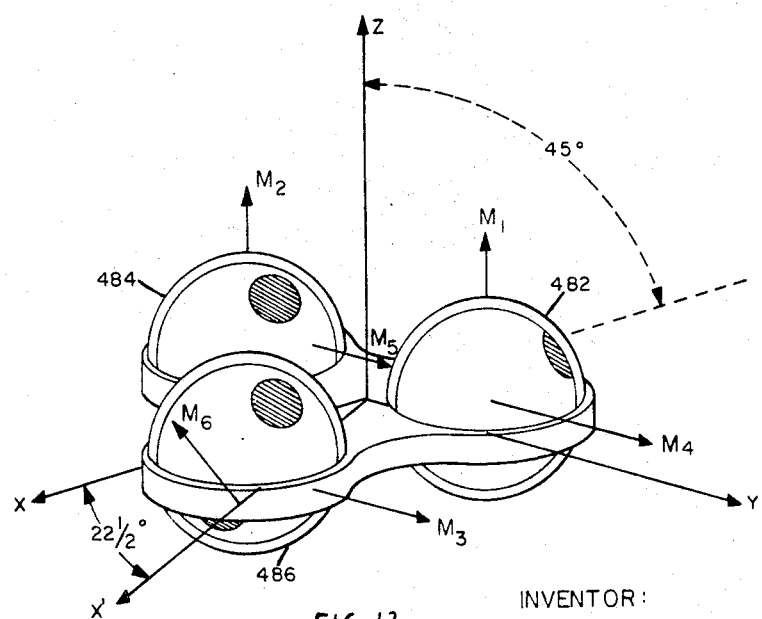
FIG. 13 depicts a system employing three gradiometers having spherically configured floats.

An alternate embodiment for a combined system uses three spherical gradiometers in place of five axially symmetric ones. This embodiment is shown in FIG. 13. As noted therein, each of gradiometers 482, 484 and 486 has the diametrical axis through its masses aligned in the same orientation as such axis in its counterpart axially symmetric gradiometer in the system of FIG. 12. Each of gradiometers 482, 484 and 486 measures two moments about axes which are orthogonal to the diameter of the masses. Each gradiometer is aligned about the diameter of the masses so that one of these axes has the same orientation as the degree of freedom in its counterpart axially symmetric gradiometer of the preferred embodiment. These axes are denoted as $M_1$, $M_2$ and $M_3$ in FIG. 13. The moments measured about these axes are identical to the moments $M_1$, $M_2$ and $M_3$, respectively, measured in the system of FIG. 12 and are given by Equation (13). These measurements are used to indicate vertical deflection in the same manner as that for the embodiment of FIG. 12.

Further, as noted in FIG. 13, the combined system also measures moments $M_4$, $M_5$ and $M_6$ with its spherical gradiometers 482, 484 and 486, respectively. These moments according to Equation (13) become
$M_4 = M_y = -(\delta g_z/\delta x)(I_{zz} - I_{xx})$
$M_5 = (1/\sqrt{2})(M_y' - M_x') = -(1/\sqrt{2})(\delta g_z/\delta x)(I_{zz}' - I_{xx}' + I_{xy}')$
$- (1/\sqrt{2})(\delta g_z/\delta y)(I_{z'z}' - I_{y'y}' + I_{x'y}')$
$M_6 = (1/\sqrt{2})(M_z'' + M_x'' \cos 22\frac{1}{2}° + M''_y \sin 22\frac{1}{2}°)$ Moments $M_4$ and $M_5$ are measurements of gravity gradient components $(\delta g_z/\delta x)$ and $(\delta g_z/\delta y)$ necessary for the indication of free air gravity anomaly. Nominally,
$I = I_{zz} - I_{xx} = I_{z'z}' - I_{x'x}' + I_{x'y}' = I_{z'z}' - I_{y'y}' + I_{x'y}'$
then, $$(\delta g_z/\delta x) = -(M_4/\Delta I)$$

$$(\delta g_z/\delta y) = (M_4 - \sqrt{2} M_5/\Delta I)$$

Moment $M_6$ gives redundant information on a combination of the already measured gravity gradient components. It is contemplated and is in the scope of the invention that this measurement be combined with the others to provide a more accurate estimate of the variables, expecially $(\delta g_z/\delta y)$. It is further contemplated that minor adjustments to the basic geometry of FIG. 13 would be made to achieve a more optimum balance among the probable errors in the measurements of the several gravity gradient components.

Having thus described my invention, I claim:
1. A gradiometer for measuring gravity gradients comprising:
   a. a symmetrically configured case;

b. a symmetrically configured float contained within said case, said float having at least one axis of symmetry and transverse axes normal to said at least one axis of symmetry, said float further having a mass distribution so as to maximize a specified inertia characteristic such that the gravity gradient to be measured produces a first torque about said at least one axis of symmetry of said float, said float being shaped to form a small clearance space between said float and said case;

c. fluid filling said clearance space surrounding said float, said fluid being of a sufficiently high density to establish a condition of essentially neutral buoyancy of said float;

d. temperature controlling means for maintaining the temperature of said fluid, said case and said float at a value substantially uniform and constant; and e. means for suspending said float in said fluid in six degrees of freedom, said suspension means comprising means for generating a signal dependent on the angular displacement of said float from a reference position relative to said case about said axis of symmetry and further comprising means responsive to said signal for producing a second torque tending to rotate said float in a direction to return said float to said reference position, and f. means for measuring the magnitude and sense of said second torque.

2. The gradiometer of claim 1 wherein said case and said float are cylinders.

3. The gradiometer of claim 2 wherein said mass distribution of said float is axially symmetric such as to maximize the magnitude of the difference of the principal transverse moments of inertia.

4. The gradiometer of claim 2 wherein said float has one axis of symmetry and wherein said mass distribution of said float is skewed such as to maximize a product of inertia describing the product of the displacement of mass along said axis of symmetry and along any one of said transverse axes.

5. The gradiometer of claim 2 wherein said float has one axis of symmetry and wherein said mass distribution of said float is such as to maximize a product of inertia describing the product of the displacement of mass along said axis of symmetry and along any one of said transverse axes and further wherein said mass distribution is such as to substantially reduce to zero the difference between the moments of inertia about any two of said transverse axes and the product of inertia describing the product of the displacements of mass along each of said two transverse axes.

6. The gradiometer of claim 1 wherein said case and said float are spheres and wherein said float has a first and second axis.

7. The gradiometer of claim 6 wherein said first and said second axes of symmetry are mutually orthogonal, and having a first transverse axis mutually orthogonal to said first and said second axes of symmetry, and wherein said mass distribution of said float is such as to maximize the magnitude of the difference of the principal moment of inertia about said first axis of symmetry and the principal moment about said first transverse axis, and to maximize the magnitude of the difference of the principal moment of inertia about said second axis of symmetry and the principal moment of inertia about said first transverse axis.

8. A gravity gradient measuring system comprising:
a. a base;
b. means for stabilizing said base relative to a reference coordinate frame comprising orthogonal axes $x, y, z$, where the $z$ axis is along the vertical;
c. at least one symmetrically configured gravity gradiometer mounted on said base, said gradiometer comprising:

a symmetrically configured case, a symmetrically configured float contained within said case, said float having at least one axis of symmetry and transverse axes normal to said at least one axis of symmetry, said float further having a mass distribution so as to maximize a specified inertia characteristic such that the gravity gradient to be measured produces a first torque about said at least one axis of symmetry of said float, said float being shaped to form a small clearance space between said float and said case, fluid filling said clearance space surrounding said float, said fluid being of a sufficiently high density to establish a condition of essentially neutral buoyancy of said float, temperature controlling means for maintaining the temperature of said fluid, said case, and said float, at a value substantially uniform and constant, means for suspending said float in said fluid in six degrees of freedom, said suspension means comprising means for generating a signal dependent on the angular displacement of said float from a reference position relative to said case about said axis of symmetry, and further comprising means responsive to said signal for producing a second torque tending to rotate said float in a direction to return said float to said reference position, and means for measuring the magnitude and sense of said second torque, whereby the axis of symmetry of each of said gradiometers is mounted relative to said inertial reference frame in an orientation dependent on the gravity gradient to be measured.

9. The gradiometer of claim 7 wherein the principal moment of inertia about said first axis of symmetry is equal to the principal moment of inertia about said second axis of symmetry.

* * * * *